(12) United States Patent
Gentiluomo (10) Patent No.: US 11,614,393 B2
(45) Date of Patent: Mar. 28, 2023

(54) CHARACTERIZING PARTICLES VIA AN ANALYTICAL FLOW FIELD

(71) Applicant: Wyatt Technology Corporation, Goleta, CA (US)

(72) Inventor: Lorenzo Gentiluomo, Munich (DE)

(73) Assignee: WYATT TECHNOLOGY CORPORATION, Goleta, CA (US)

( * ) Notice: Subject to any disclaimer, the term of this patent is extended or adjusted under 35 U.S.C. 154(b) by 149 days.

(21) Appl. No.: 17/060,070

(22) Filed: Sep. 30, 2020

(65) Prior Publication Data

US 2021/0102882 A1 Apr. 8, 2021

Related U.S. Application Data

(60) Provisional application No. 62/908,135, filed on Sep. 30, 2019.

(51) Int. Cl.
*G01N 15/06* (2006.01)
*G01N 21/11* (2006.01)
*G01N 21/03* (2006.01)

(52) U.S. Cl.
CPC .............. *G01N 15/06* (2013.01); *G01N 21/11* (2013.01); *G01N 2015/0693* (2013.01); *G01N 2021/0357* (2013.01)

(58) Field of Classification Search
CPC ........... G01N 15/06; G01N 2015/0053; G01N 2015/0693; G01N 2021/0357; G01N 21/11
See application file for complete search history.

(56) References Cited

U.S. PATENT DOCUMENTS

| 2004/0017568 | A1* | 1/2004 | Wyatt | G01N 15/0255 356/338 |
| 2005/0266582 | A1* | 12/2005 | Modlin | G01N 21/77 436/164 |
| 2007/0155017 | A1* | 7/2007 | Wyatt | G01N 15/0255 436/45 |
| 2013/0175175 | A1* | 7/2013 | Austin | G01N 27/44721 204/603 |
| 2016/0011155 | A1* | 1/2016 | Klein | G01N 30/38 73/61.56 |
| 2016/0238571 | A1* | 8/2016 | Welz | B01D 11/04 |

FOREIGN PATENT DOCUMENTS

WO WO-2018165627 A1 * 9/2018 ............. B01D 57/02

* cited by examiner

*Primary Examiner* — Mark R Gaworecki
(74) *Attorney, Agent, or Firm* — Leonard T. Guzman (57) ABSTRACT

The present disclosure describes a sample cell, method, and a computer implemented method of characterizing particles via an analytical flow field. In an exemplary embodiment, the sample cell includes (1) a sample cuvette including a top sample membrane, a sample container to contain a sample, and a bottom sample membrane, (2) a reference cuvette including a top reference membrane, a reference container to contain a solvent, and a bottom reference membrane, (3) where the sample cell is configured to allow a concentration boundary to form within the sample cell, and (4) where the sample cell is configured to allow the concentration boundary to move toward a bottom of the sample cell until equilibrium is reached in the sample cell.

11 Claims, 9 Drawing Sheets

CHARACTERIZING PARTICLES VIA AN ANALYTICAL FLOW FIELD

PRIORITY

This application claims priority to U.S. Provisional Patent Application No. 62/908,135, filed Sep. 30, 2019.

BACKGROUND

The present disclosure relates to field flow fractionators, and more specifically, to characterizing particles via an analytical flow field.

SUMMARY

The present disclosure describes a sample cell, method, and a computer implemented method of characterizing particles via an analytical flow field. In an exemplary embodiment, the sample cell includes (1) a sample cuvette including a top sample membrane, a sample container to contain a sample, and a bottom sample membrane, (2) a reference cuvette including a top reference membrane, a reference container to contain a solvent, and a bottom reference membrane, (3) where the sample cell is configured to allow a concentration boundary to form within the sample cell, and (4) where the sample cell is configured to allow the concentration boundary to move toward a bottom of the sample cell until equilibrium is reached in the sample cell.

In an exemplary embodiment, the method includes (1) injecting a sample into a sample cuvette via a sample injector coupled to the sample cuvette, where the sample cuvette includes a top sample membrane, a sample container to contain the sample, and a bottom sample membrane, (2) injecting a solvent into a reference cuvette via a solvent injector coupled to the reference cuvette, where the reference cuvette includes a top reference membrane, a reference container to contain the solvent, and a bottom reference membrane, (3) measuring a concentration of the sample in the sample cuvette over time via a concentration detector coupled to the sample cuvette, (4) in response to the concentration reaching an equilibrium value, flowing the solvent into the top sample membrane and into the top reference membrane at a particular time, via a flow controller coupled to the sample cuvette and coupled to the reference cuvette, and in response to the flowing, measuring at least one property of the sample.

In an exemplary embodiment, the computer implemented method includes (1) transmitting, by a computer system, an inject sample command to a sample injector to inject a sample into a sample cuvette including a top sample membrane, a sample container to contain the sample, and a bottom sample membrane, (2) transmitting, by a computer system, a inject solvent command to a solvent injector to inject a solvent into a reference cuvette including a top reference membrane, a reference container to contain the solvent, and a bottom reference membrane, (3) transmitting, by the computer system, to a concentration detector coupled to the sample cuvette to measure a concentration of the sample in the sample cuvette over time, (4) executing, by the computer system, a set of logical operations determining that the concentration of the sample equals an equilibrium value, (5) in response to the determining, transmitting, by the computer system, to a flow controller coupled to the sample cuvette and coupled to the reference cuvette a flow command to flow the solvent into the top sample membrane and into the top reference membrane at a particular time, and (6) in response to the transmitting the flow command, executing, by the computer system, a set of logical operations measuring at least one property of the sample.

DETAILED DESCRIPTION

The present disclosure describes a sample cell, method, and a computer implemented method of characterizing particles via an analytical flow field. In an exemplary embodiment, the sample cell includes (1) a sample cuvette including a top sample membrane, a sample container to contain a sample, and a bottom sample membrane, (2) a reference cuvette including a top reference membrane, a reference container to contain a solvent, and a bottom reference membrane, (3) where the sample cell is configured to allow a concentration boundary to form within the sample cell, and (4) where the sample cell is configured to allow the concentration boundary to move toward a bottom of the sample cell until equilibrium is reached in the sample cell.

In an exemplary embodiment, the method includes (1) injecting a sample into a sample cuvette via a sample injector coupled to the sample cuvette, where the sample cuvette includes a top sample membrane, a sample container to contain the sample, and a bottom sample membrane, (2) injecting a solvent into a reference cuvette via a solvent injector coupled to the reference cuvette, where the reference cuvette includes a top reference membrane, a reference container to contain the solvent, and a bottom reference membrane, (3) measuring a concentration of the sample in the sample cuvette over time via a concentration detector coupled to the sample cuvette, (4) in response to the concentration reaching an equilibrium value, flowing the solvent into the top sample membrane and into the top reference membrane at a particular time, via a flow controller coupled to the sample cuvette and coupled to the reference cuvette, and in response to the flowing, measuring at least one property of the sample.

In an exemplary embodiment, the computer implemented method includes (1) transmitting, by a computer system, an inject sample command to a sample injector to inject a sample into a sample cuvette including a top sample membrane, a sample container to contain the sample, and a bottom sample membrane, (2) transmitting, by a computer system, a inject solvent command to a solvent injector to inject a solvent into a reference cuvette including a top reference membrane, a reference container to contain the solvent, and a bottom reference membrane, (3) transmitting, by the computer system, to a concentration detector coupled to the sample cuvette to measure a concentration of the sample in the sample cuvette over time, (4) executing, by the computer system, a set of logical operations determining that the concentration of the sample equals an equilibrium value, (5) in response to the determining, transmitting, by the computer system, to a flow controller coupled to the sample cuvette and coupled to the reference cuvette a flow command to flow the solvent into the top sample membrane and into the top reference membrane at a particular time, and (6) in response to the transmitting the flow command, executing, by the computer system, a set of logical operations measuring at least one property of the sample.

In an embodiment, the sample cell, the method, and the computer implemented method use a static flow field instead of a centrifugal field which could lead to a 4000 fold increase in throughput, very low manufacturability cost, and lower safety hazards compared to analytical ultracentrifugation (AUC).

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Concentration Detector

Differential Refractive Index Detector

A differential refractive index detector (dRI), or differential refractometer, or refractive index detector (RI or RID), is a detector that measures the refractive index of an analyte relative to the solvent. They are often used as detectors for high-performance liquid chromatography and size exclusion chromatography. dRIs are considered to be universal detectors because they can detect anything with a refractive index different from the solvent, but they have low sensitivity. When light leaves one material and enters another it bends, or refracts. The refractive index of a material is a measure of how much light bends when it enters.

A differential refractive index detector contain a flow cell with the following two parts: one for the sample; and one for the reference solvent. The dRI measures the refractive index of both components. When only solvent is passing through the sample component, the measured refractive index of both components is the same, but when an analyte passes through the flow cell, the two measured refractive indices are different. The difference appears as a peak in the chromatogram. Differential refractive index detectors are often used for the analysis of polymer samples in size exclusion chromatography. A dRI could output a concentration detector signal value corresponding to a concentration value of a sample.

Ultraviolet-Visible Spectroscopy

Ultraviolet-visible spectroscopy or ultraviolet-visible spectrophotometry (UV-Vis or UV/Vis) refers to absorption spectroscopy or reflectance spectroscopy in the ultraviolet-visible spectral region. An ultraviolet-visible detector/ultraviolet-visible spectrophotometer uses light in the visible and adjacent ranges, where the absorption or reflectance in the visible range directly affects the perceived color of the chemicals involved, where in this region of the electromagnetic spectrum, atoms and molecules undergo electronic transitions. Such absorption spectroscopy measures transitions from the ground state to the excited state. An ultraviolet-visible detector/ultraviolet-visible spectrophotometer measures the intensity of light passing through a sample (I), and compares it to the intensity of light before it passes through the sample ($I_o$), where the ratio $I/I_o$ is called the transmittance, and is usually expressed as a percentage (% T). The absorbance, A, is based on the transmittance according to $$A = -\log(\% \text{ T}/100\%).$$

The UV-visible spectrophotometer can also be configured to measure reflectance, where the spectrophotometer measures the intensity of light reflected from a sample (I), and compares it to the intensity of light reflected from a reference material ($I_o$), where the ratio $I/I_o$ is called the reflectance, and is usually expressed as a percentage (% R). An ultraviolet absorption detector could output a concentration detector signal value corresponding to a concentration value of a sample.

Analytical Ultracentrifugation

Analytical ultracentrifugation (AUC) is a versatile tool for the study of proteins. Monitoring the sedimentation of macromolecules in the centrifugal field allows their hydrodynamic and thermodynamic characterization in solution, without interaction with any matrix or surface. The combination of new instrumentation and powerful computational software for data analysis has led to major advances in the characterization of proteins and protein complexes.

Although analytical ultracentrifugation (AU) played a notable role in the history of the characterization of proteins and protein complexes (Schachman 1992), this methodology has suffered a decline in use for many years, in considerable part because of a lack of new instrumentation due to high prices and low throughput which decrease the possibility to use this technique in an industrial environment.

Very important new approaches for the determination of sedimentation coefficients and the deconvolution of sedimenting species have been introduced with respect to the analysis of boundary sedimentation velocity (SV) data. With regard to sedimentation equilibrium (SE) analysis, investigators now have the ability to determine association constants for many homogeneous and heterogeneous interacting systems from such measurements.

Although AUC is typically not conducted with high throughput, it is firmly based on equilibrium and nonequilibrium thermodynamics and does represent the gold standard for characterizing the hydrodynamic properties of proteins and protein complexes, as well as molar-mass and binding-constant determinations.

The application of a centrifugal force in an AUC experiment causes the depletion of macromolecules at the meniscus and the formation of a concentration boundary that moves toward the bottom of the centrifuge cell as a function of time.

The data measured in AUC are concentration profiles in the radial direction as a function of time. Hence, conceptually the simplest determination of a macromolecular sedimentation coefficient is based on the formation of a sedimentation boundary in a high centrifugal field, where the s-value might be determined, for example, by the displacement of the boundary midpoint. The analysis of multicomponent protein mixtures or protein samples with possible contamination by peptides or aggregates can be of considerable importance for a complete characterization of a protein system under investigation. Such systems may have resolvable sedimentation species, and one would observe two or more boundaries as a function of time.

At centrifugal fields lower than those generally used for Sedimentation Velocity experiments, sedimentation is balanced by diffusional transport, and sedimentation equilibrium is achieved when the net transport vanishes throughout the solution. It can be easily established by running the centrifuge until the concentration distribution appears to be invariant with time. For a single protein, only one exponential distribution will be present, which readily allows for the determination of the buoyant molar mass of this molecule. Interacting systems are of particular interest to protein scientists. With some modifications to introduce equilibrium constants and mass action law, Sedimentation Equilibrium experiment can describe reversibly of formed protein complexes. For self-associating systems, we can relate the molar concentration at the reference point of all oligomeric species.

The enhanced features of interference optics include (1) all biological macromolecules can be detected through refractive index changes, and consequently, non-absorbing biopolymers, such as polysaccharides, can be investigated, (2) ligand- or drug-induced changes in protein conformation or association (e.g., ATP- or GTP-binding proteins) can be analyzed without concern that the UV absorbance of the ligand/drug will obscure the protein absorbance, (3) macromolecular solute concentrations can be increased well beyond the range of the absorbance system, thereby allowing a much greater concentration range for SE, and (4) because interference patterns are recorded from the entire cell at once, large data sets can be rapidly accumulated for SV experiments, significantly improving the computational analysis for the detection of sedimenting species. The disadvantage of interference optics is that more care has to be taken in matching the volume and chemical composition of the sample and reference columns and ensuring that the optics are correctly adjusted.

Analytical Flow Field

Analytical Flow Field (AFF) derives from the basic concepts of Analytical ultracentrifugation (AUC). AUC applies centrifugal forces to carry velocity and equilibrium experiment. I propose the use of a static flow field to mimic the centripetal force experienced by macromolecules. The possibility of using a flow field to reach equilibrium of diffusing molecules is well known and commonly applied in flow-FFF during the focusing step. Following this procedure as a function of time would give rise to the same outcome saw in an equilibrium experiment carried out by AUC. Similarly, using higher flow field a velocity experiment could be carried out.

Gravitational and flow field have been applied in Flow-FFF and Sedimentation-FFF to reach physical separation of molecules. At the best of my knowledge there is no previous art describing the use of a flow field to study the formation of a concentration boundary that moves toward the bottom until equilibrium is reached in a cell as a function of time.

The great advantage of a flow field compared to a centrifugal field is the through. In fact a sedimentation velocity experiment using a centrifugal field could take 1 to 2 days while an equilibrium experiment commonly takes as much as 14 days. It's well known that the equilibrium can be forced by flow field in matter of minutes (e.g. 5 to 30 min). This means that a flow field is 4000 times faster than a centrifugal field to reach equilibrium. Moreover a flow field requires relatively cheap and safe equipment while centrifugal equipment is very expensive (around half a million dollars) and dangerous due to the high centrifugal force necessary for the sedimentation of proteins in a reasonable amount of time. Thus, there is a need to characterizing particles via an analytical flow field.

Figure 1A:
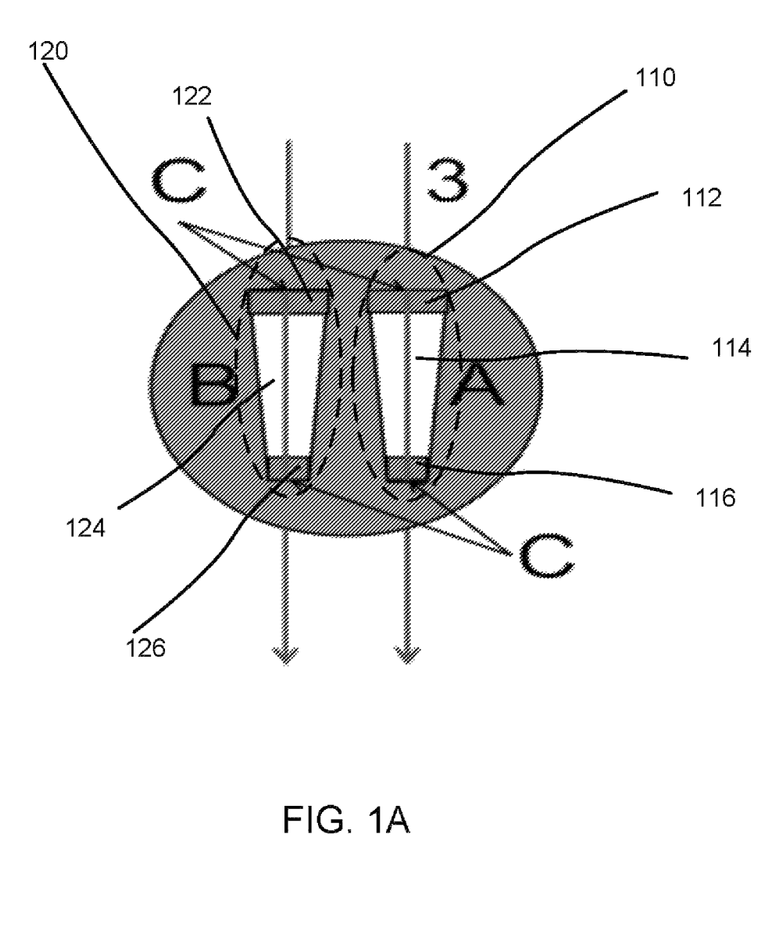
FIG. 1A depicts an exemplary embodiment.

Referring to FIG. 1A, in an exemplary embodiment, the sample cell includes a sample cuvette 110 including a top sample membrane 112, a sample container 114 to contain a sample, and a bottom sample membrane 116, (2) a reference cuvette 120 including a top reference membrane 122, a reference container 124 to contain a solvent, and a bottom reference membrane 126, (3) where the sample cell is configured to allow a concentration boundary to form within the sample cell, and (4) where the sample cell is configured to allow the concentration boundary to move toward a bottom of the sample cell until equilibrium is reached in the sample cell.

Figure 1B:
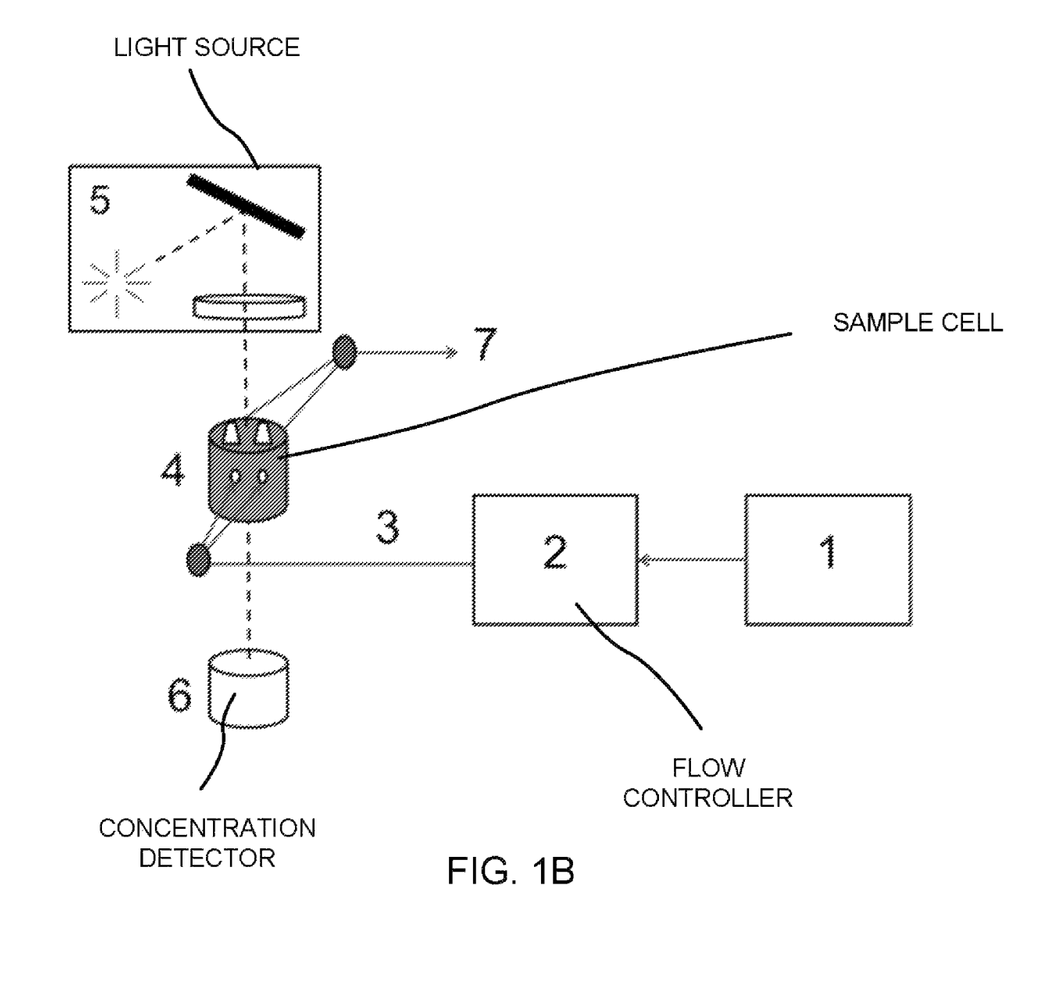
FIG. 1B depicts an apparatus in accordance with an embodiment.

In an embodiment, the top sample membrane includes (a) a frit, and (b) a semipermeable membrane, where the semipermeable membrane is permeable to the solvent, and where the semipermeable membrane is not permeable to the sample. In an embodiment, the top reference membrane includes (a) a frit, and (b) a semipermeable membrane. In an embodiment, as depicted in FIG. 1B, the sample cell/cell is configured to be connected to a flow controller, the sample cuvette is configured to be illuminated by a light source, the reference cuvette is configured to be illuminated by the light source, a concentration detector is configured to measure a sample concentration of the sample in the sample cuvette, and the concentration detector is configured to measure a reference concentration of the solvent in the reference cuvette.

Figure 2:
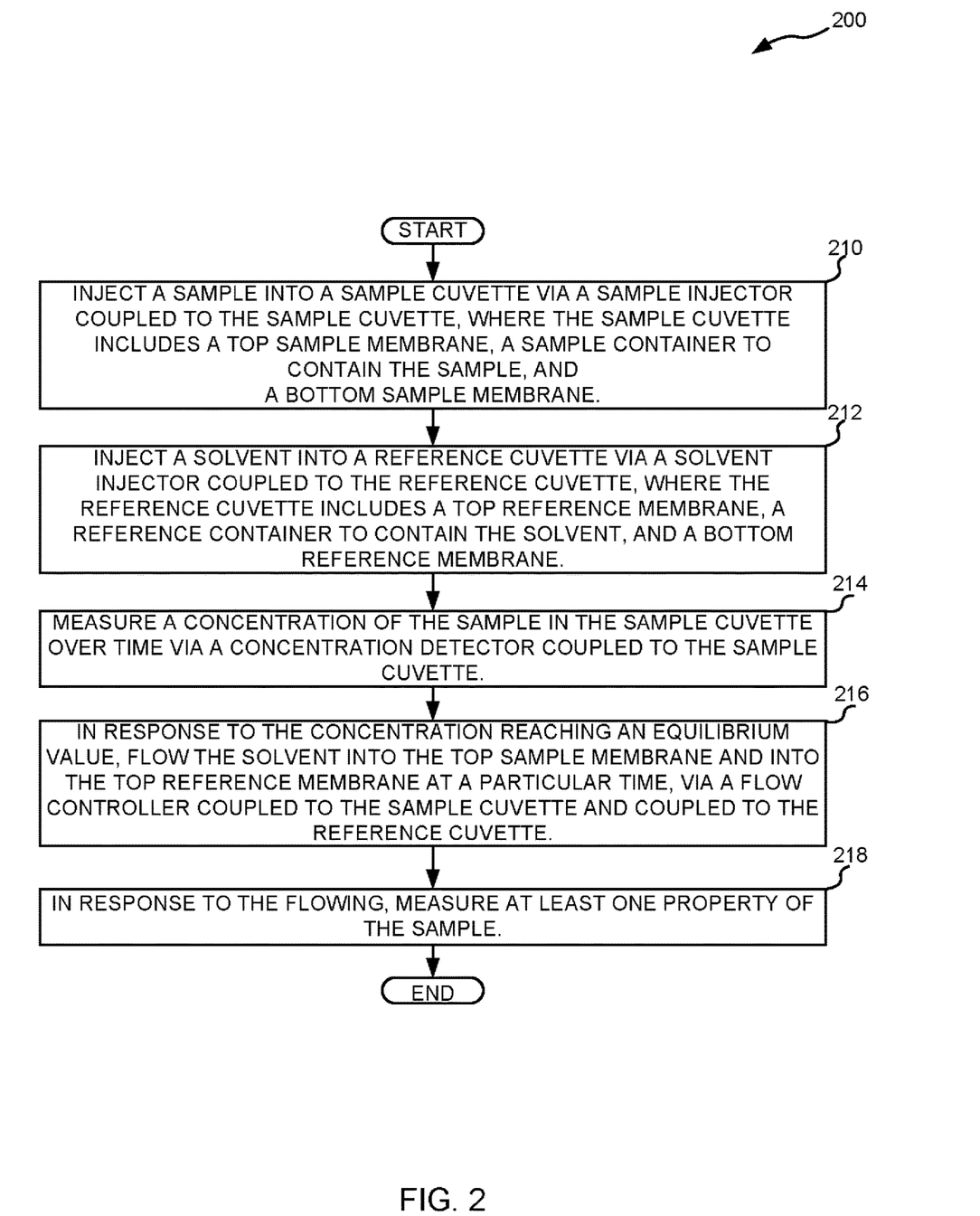

In an embodiment, the flow controller is a field flow fractionator. In a particular embodiment, the field flow fractionator (FFF) includes at least one of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system. In an embodiment, the concentration detector is one of an ultraviolet-visible absorption detector, a differential refractive index detector, and a fluorescence detector Referring to FIG. 2, in an exemplary embodiment, the method includes a step 210 of injecting a sample into a sample cuvette via a sample injector coupled to the sample cuvette, where the sample cuvette includes a top sample membrane, a sample container to contain the sample, and a bottom sample membrane, a step 212 of injecting a solvent into a reference cuvette via a solvent injector coupled to the reference cuvette, where the reference cuvette includes a top reference membrane, a reference container to contain the solvent, and a bottom reference membrane, a step 214 of measuring a concentration of the sample in the sample cuvette over time via a concentration detector coupled to the sample cuvette, a step 216 of, in response to the concentration reaching an equilibrium value, flowing the solvent into the top sample membrane and into the top reference membrane at a particular time, via a flow controller coupled to the sample cuvette and coupled to the reference cuvette, and a step 218 of, in response to the flowing, measuring at least one property of the sample. In an embodiment measuring step 218 includes measuring the at least one property of the sample via the concentration detector.

Figure 3:
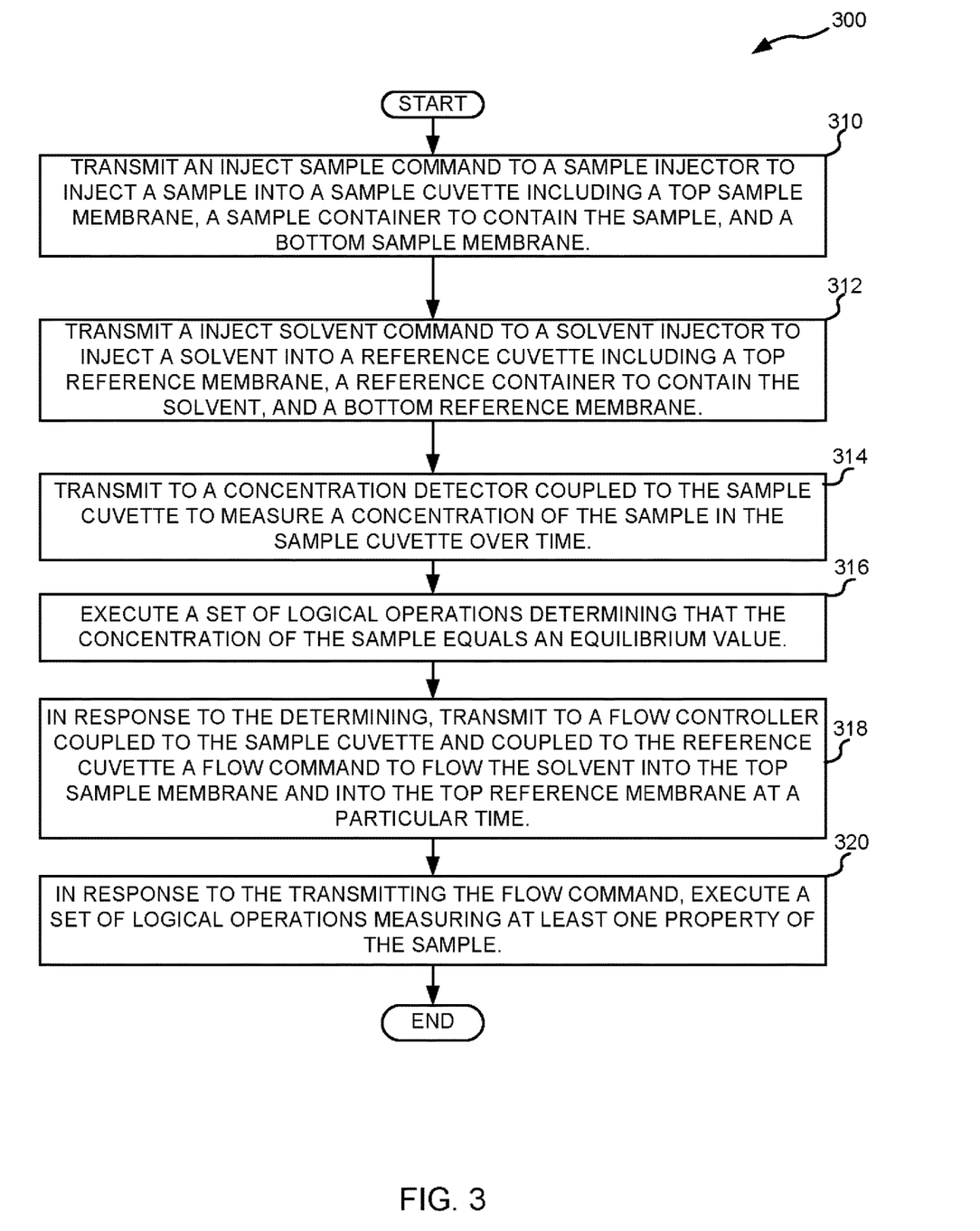

Referring to FIG. 3, in an exemplary embodiment, the computer implement method is configured to perform an operation 310 of transmitting, by a computer system, an inject sample command to a sample injector to inject a sample into a sample cuvette including a top sample membrane, a sample container to contain the sample, and a bottom sample membrane, an operation 312 of transmitting, by a computer system, a inject solvent command to a solvent injector to inject a solvent into a reference cuvette including a top reference membrane, a reference container to contain the solvent, and a bottom reference membrane, an operation 314 of transmitting, by the computer system, to a concentration detector coupled to the sample cuvette to measure a concentration of the sample in the sample cuvette over time, an operation 316 of executing, by the computer system, a set of logical operations determining that the concentration of the sample equals an equilibrium value, an operation 318 of, in response to the determining, transmitting, by the computer system, to a flow controller coupled to the sample cuvette and coupled to the reference cuvette a flow command to flow the solvent into the top sample membrane and into the top reference membrane at a particular time, and an operation 320 of, in response to the transmitting the flow command, executing, by the computer system, a set of logical operations measuring at least one property of the sample. In an embodiment, operation 320 includes measuring the at least one property of the sample via the concentration detector.

Figure 8:
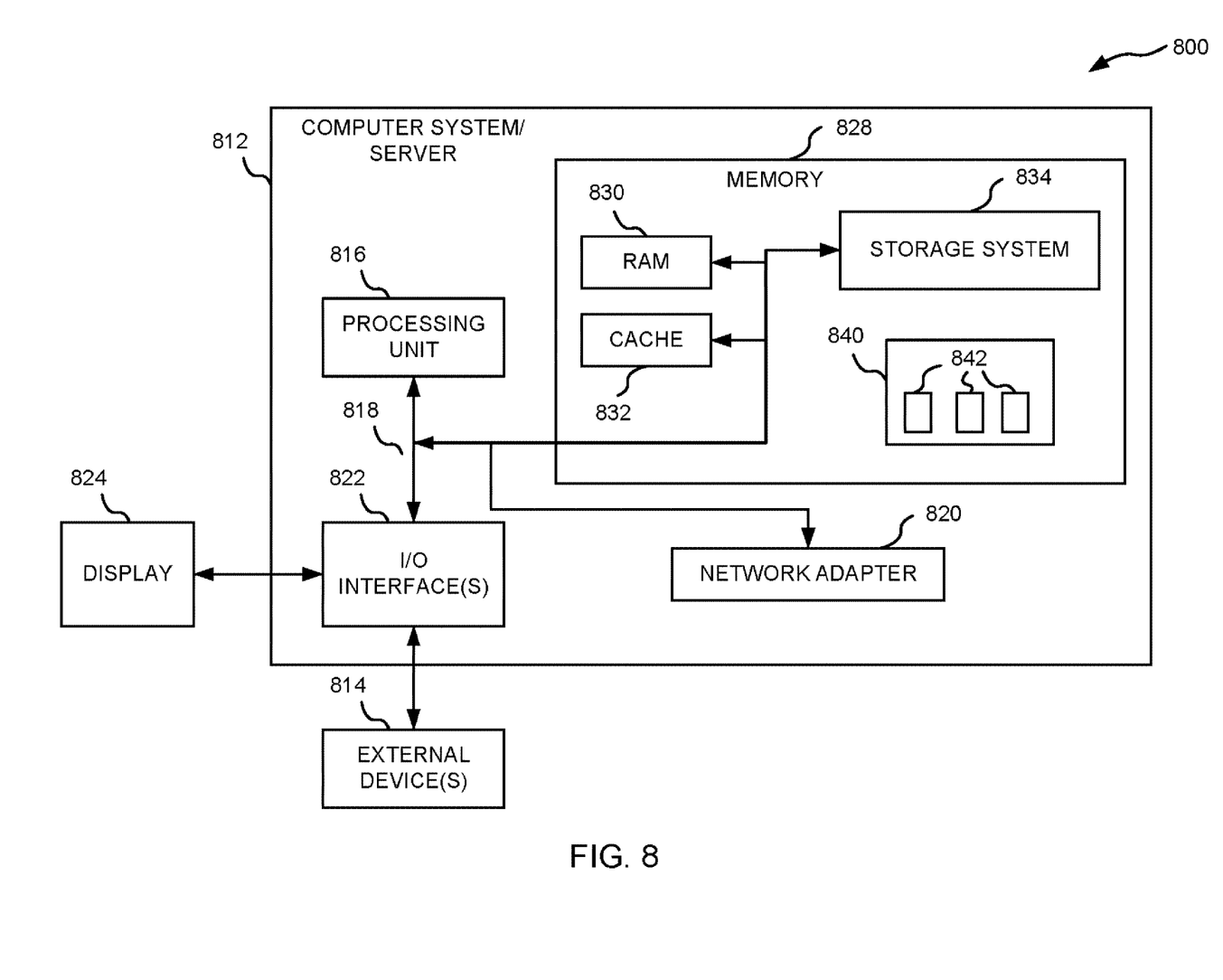
FIG. 8 depicts a computer system in accordance with an exemplary embodiment.

In an exemplary embodiment, the computer system is a standalone computer system, such as computer system 800 shown in FIG. 8, a network of distributed computers, where at least some of the computers are computer systems such as computer system 800 shown in FIG. 8, or a cloud computing node server, such as computer system 800 shown in FIG. 8. In an embodiment, the computer system is a computer system 800 as shown in FIG. 8, that executes a measuring attributes of a viral gene delivery vehicle (VGDV) sample via separation script or computer software application that carries out the operations of at least method 300. In an embodiment, the computer system is a computer system/server 812 as shown in FIG. 8, that executes a measuring attributes of a viral gene delivery vehicle (VGDV) sample via separation script or computer software application that carries out the operations of at least method 300. In an embodiment, the computer system is a processing unit 816 as shown in FIG. 8, that executes a measuring attributes of a viral gene delivery vehicle (VGDV) sample via separation script or computer software application that carries out the operations of at least method 300. In an embodiment, the computer system is a processor of the analytical instrument, that executes a measuring attributes of a viral gene delivery vehicle (VGDV) sample via separation script or computer software application that carries out the operations of at least method 300.

EXAMPLE

For example, molecules are trapped in the sample cell, where the sample cell is sector shaped, by means of a semipermeable membrane, permeable to the solvent but not to the samples, with a defined cut-off which will depend on the molecule under study. The samples can be prepared manually in the cell or an injection port can be added thanks to the use of a FFF could automatize the procedure. The sample needs to be equilibrated at controlled temperature before starting the flow. All separation happens in a single phase, possibly using the condition of the naïve sample, thereby eliminating the potential problems caused by matrix-protein interaction. Also, for example, the flow controller controls the flow. Before starting the flow the sample needs to be equilibrated at controlled temperature.

For a UV absorption optical system, the radial position is measured by a moving slit/lens assembly above the photomultiplier tube located on the bottom of the chamber. The temperature of the cell is monitored by a radiometer and regulated by thermoelectric modules. The temperature fluctuation of the refrigeration need to not exceed 1° C., and the corresponding cell chamber and sample temperature fluctuation need to have a fluctuation of less than 0.05° C. upon reaching thermal equilibrium. These conditions are required to attain accuracy similar to AUC. The protein concentrations during a run are measured by either interference or absorption optical systems. The detectors are necessary to follow the formation of a concentration boundary that moves toward the bottom of the centrifuge cell as a function of time. Both detection methods offer their unique advantages.

The interference optical system measures the protein concentration based on changes in refractive index. It provides rapid, high precision data acquisition for samples at a broad range of concentrations. In addition, the interference system can be applied to molecular species that do not contain chromophores, which provide a significant absorbance in the UV-visible range. In contrast, the absorption optical system measures protein concentration based upon the fact that many macromolecular species, such as protein and DNA, contain chromophores that absorb incident light in the UV range. The concentration of macromolecules is calculated according to Beer's law. The absorption optical system offers very high sensitivity and can discriminate between molecules with different chromophores. The absorption optical system uses a Xenon flash lamp, providing a usable wavelength range over 190 to 800 nm. The light goes through a toroidal diffraction grating monochromator to produce incident light at a single wavelength. The accuracy of wavelength is calibrated with the intensity profile of incident light and verified by a wavelength reference cell that contains a holmium oxide filter. The typical accuracy of wavelength is approximately ±2 nm. The light source for the interference optical system uses a 30-mW, 660-nm laser. The interference patterns are recorded digitally on a charge-coupled device (CCD) camera and then converted to a graphical representation of fringe displacement as a function of radial position.

Figure 4:
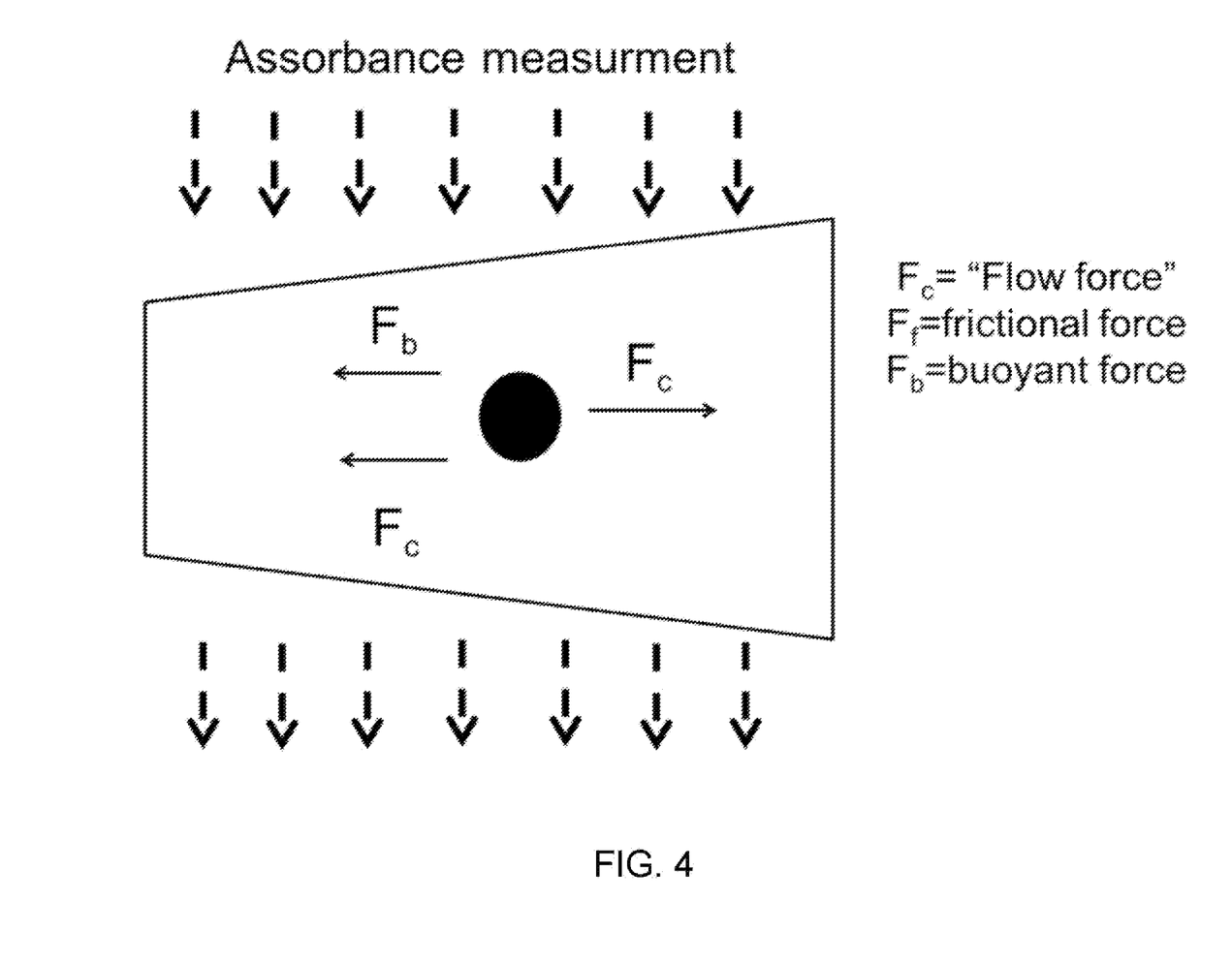
FIG. 4 depicts an apparatus in accordance with an embodiment.

Once that the flow start the sample will experience a sum of forces as shown in FIG. 4.

The application of a flow force, as depicted in FIG. 4, causes the depletion of macromolecules at the meniscus and the formation of a concentration boundary that moves toward the bottom of the cell as a function of time. The data can be model directly with the underlying transport equation, known as the Lamm equation, as follows:

$$\frac{\partial \chi(r,t)}{\partial t} = \frac{1}{r}\frac{\partial}{\partial r}\left[rD\frac{\partial \chi(r,t)}{\partial r} - s\omega^2 r^2 \chi(r,t)\right].$$

Where the squared rotor speed, w2, needs to be exchanged with the flow force, $w2=Fc/rm(1-pp_s^{-1})$). The new equation can be solve exactly in the same way as is nowadays solved the Lamm equation. Nonlinear least-squares regression can be performed to find a numerical solution. Extensive literature is available on methods to solve the Lamm equation. Modeling the Lamm equation, in an AUC experiment, takes full advantages of the 105 data points usually acquired during the experiment. In AFF, due to the high throughputability, the amount of data and the new flow approach could bring to lower point density and overall fit quality. Anyhow the possibility to achieve equilibrium experiments in matters of minutes makes the equilibrium approach more attractive (usually avoided in AUC since it can take several days, i.e. around 14). In equilibrium, the concentration distribution generally approaches an exponential (for derivations, see van Holde et al. 1998), and for a mixture of non-interacting ideally sedimenting solutes, the measured signal as a function of radial position, a(r), takes the following form:

$$a(r) = \sum_n c_{n,o} \, \varepsilon_n d\exp\left[\frac{M_n(1-\bar{v}_n\rho)\omega^2}{2RT}(r^2 - r_0^2)\right] + \delta.$$

Presently, computational software can readily fit an exponential model to determine the molar mass. In fact, the power of global nonlinear regression fitting of multiple data sets has enormously extended the applications of SE to complex systems. Nonlinear least-squares parameter estimation is the major numerical method for SE data analysis.

Finally, AFF could represent a new gold standard for protein particle conformation, structure, stability and interaction. AFF could solve all the major drop-backs of an AUC, namely low throughputability, high costs and safety hazard, while firmly based on equilibrium and nonequilibrium thermodynamics for characterizing the hydrodynamic properties of proteins and protein complexes, as well as molar-mass and binding-constant determinations. converted to a graphical representation of fringe displacement as a function of radial position.

Figure 5:
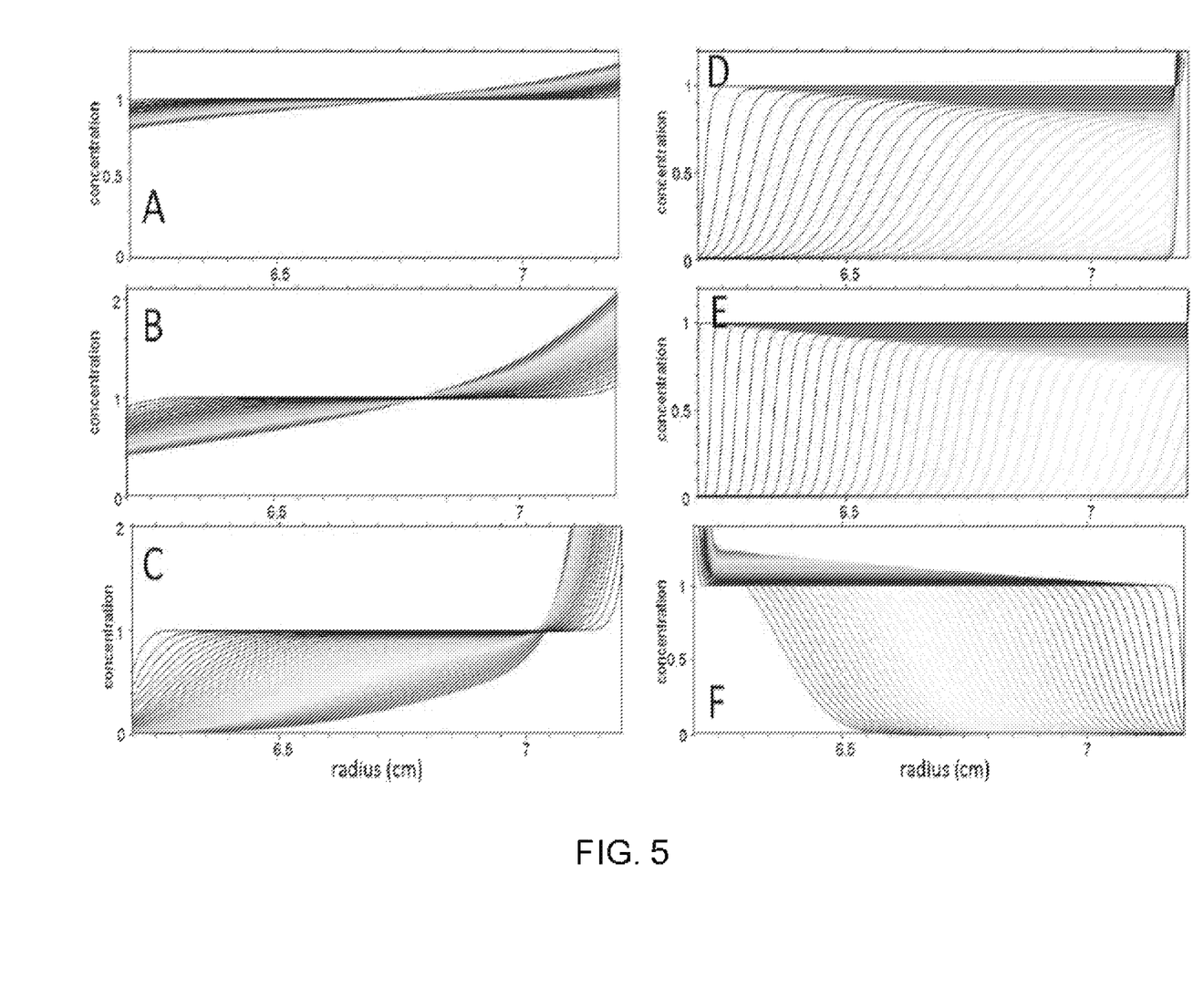
FIG. 5 depicts a graph in accordance with an embodiment.

FIG. 5 depicts an example of expected raw data from a calculated from Zhao et al 2013 velocity experiment for a series of molecules. The same calculation applies theoretically also for AFF. FIG. 5 depicts examples for the shapes of Lamm equation solutions. The profiles are calculated for particles of different size and sedimentation properties. (A) Small molecules with a sedimentation coefficient of 0.2 S and a diffusion coefficient of 6×10−6 cm2/sec, in Δt=300 sec intervals. Similar values are frequently observed for sedimenting buffer salts. (B) Sedimentation of a peptide of 1 kg/mol and 0.3 S, Δt=1000 sec. (C) A small protein of 10 kg/mol and 1.5 S, Δt=500 sec. (D) A protein of 100 kg/mol and 6 S, Δt=300 sec. (E) Particle of 1 Mg/mol and 30 S, Δt=50 sec. (F) A floating particle with a sedimentation coefficient of −3.0 S and a diffusion coefficient of 2.71×10−7 cm2/sec. Such data patterns may be obtained, for example, with large emulsion or lipid particles. In flotation, the radial dilution is replaced with radial increase in concentration in the plateau region of successive profiles. (Figure reproduced from (Zhao, 2013).

From FIG. 5 it is possible to appreciate the different sedimentation behavior as the function of the molecule size. Bigger molecule will sediment at faster rate. Small molecule (e.g. FIG. 5C) would reach a point where the molecules will go under back-diffusion. The raw data are then processed by the Lamm equation adjusted by the right flow force (w2=Fc/rm(1−pp$_s^{-1}$)).

Figure 6:
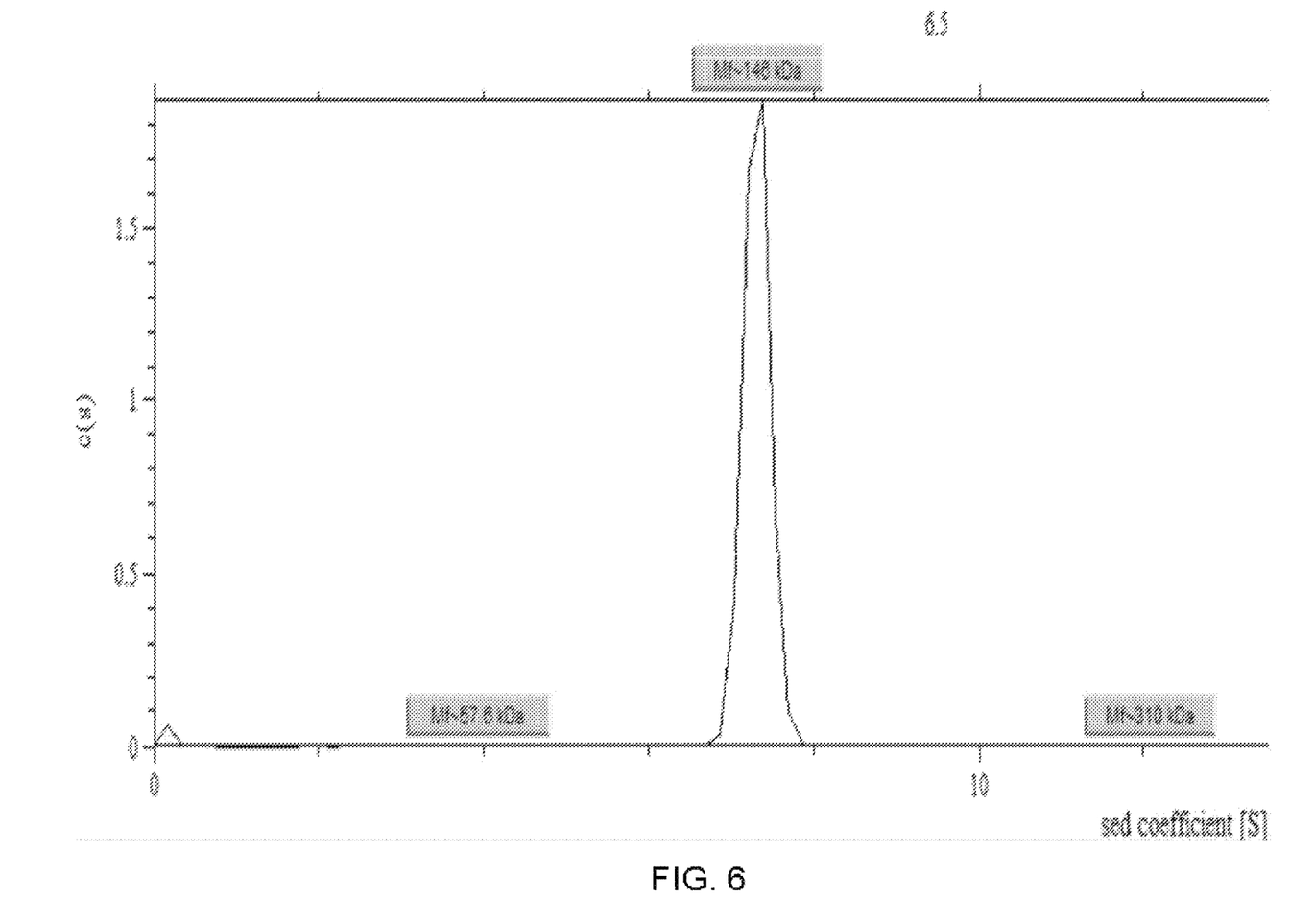
FIG. 6 depicts a graph in accordance with an embodiment.

FIG. 6 depicts expected results data for a classical therapeutic antibody is shown.

Figure 7:
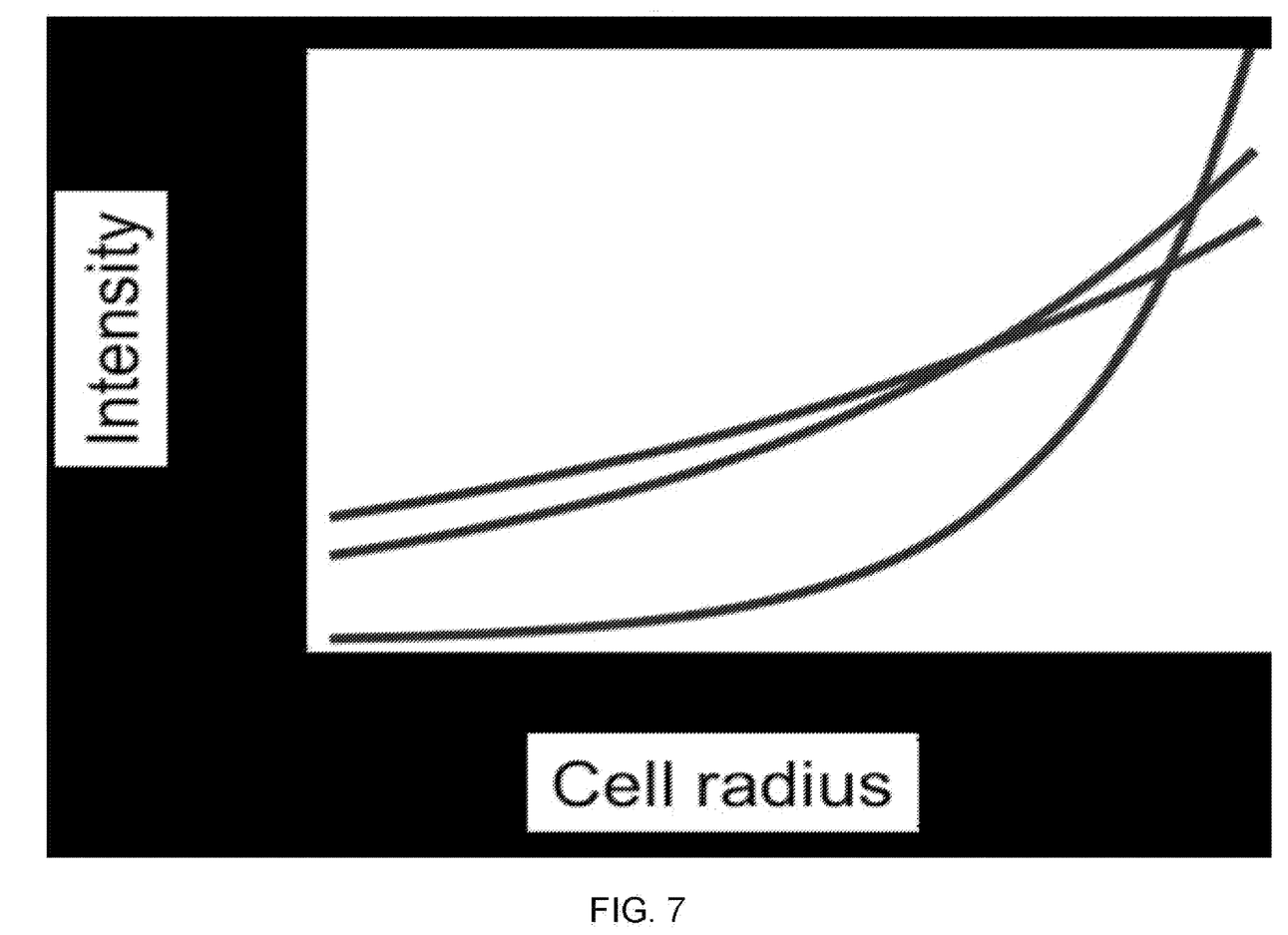
FIG. 7 depicts a graph in accordance with an embodiment.

FIG. 7 depicts raw data for a sedimentation equilibrium experiment and the dynamic equilibrium of sedimentation and diffusion is attained inside the sample cell. At first, the centrifugal field causes the material to sediment towards the cell bottom, increasing the local solute concentration. This causes back diffusion (diffusion is concentration dependent) to increase, opposing the centrifugal field. When the stationary condition is reached the data can be processed. Consequently, the technique permits direct measurement of the molecular weight of the molecule in solution and of Mw and M the weight- and z-average molecular weight distributions (see Analytical Ultracentrifugation). It is also one of the few direct methods, other than titration calorimetry and equilibrium dialysis, for accurately measuring the binding constants between macromolecules. FIG. 7 depicts a sedimentation equilibrium profile, where the raw data are plotted as sample absorbance (sample solution minus reference solution) versus radial distance from the center of rotor rotation. The slope of the line is directly proportional to the solute weight-average molecular weight Mw.

Computer System

In an exemplary embodiment, the computer system is a computer system 800 as shown in FIG. 8. Computer system 800 is only one example of a computer system and is not intended to suggest any limitation as to the scope of use or functionality of embodiments of the present invention. Regardless, computer system 800 is capable of being implemented to perform and/or performing any of the functionality/operations of the present invention.

Computer system 800 includes a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 812 may be described in the general context of computer system-executable instructions, such as program modules, being executed by a computer system. Generally, program modules may include routines, programs, objects, components, logic, and/or data structures that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computer system 800 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions/operations of embodiments of the invention.

Program/utility 840, having a set (at least one) of program modules 842, may be stored in memory 828 by way of example, and not limitation. Exemplary program modules 842 may include an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the present invention.

Computer system/server 812 may also communicate with one or more external devices 814 such as a keyboard, a pointing device, a display 824, one or more devices that enable a user to interact with computer system/server 812, and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A sample cell comprising:
   a sample cuvette comprising
      a top sample membrane,
      a sample container to contain a sample, and
      a bottom sample membrane;
   a reference cuvette comprising
      a top reference membrane,
      a reference container to contain a solvent, and
      a bottom reference membrane;
   wherein the sample cell is configured to allow a concentration boundary to form within the sample cell; and
   wherein the sample cell is configured to allow the concentration boundary to move toward a bottom of the sample cell until a concentration of the sample in the sample cuvette measured over time via a concentration detector coupled to the sample cuvette is invariant over time.

2. The sample cell of claim 1 wherein the top sample membrane comprises:
   a frit; and
   a semipermeable membrane,
      wherein the semipermeable membrane is permeable to the solvent,
      wherein the semipermeable membrane is not permeable to the sample.

3. The sample cell of claim 1 wherein the top reference membrane comprises:
   a frit; and
   a semipermeable membrane.

4. The sample cell of claim 1
   wherein the sample cell is configured to be connected to a flow controller,
   wherein the sample cuvette is configured to be illuminated by a light source,
   wherein the reference cuvette is configured to be illuminated by the light source, and
   wherein a concentration detector is configured to measure a sample concentration of the sample in the sample cuvette, and
   wherein the concentration detector is configured to measure a reference concentration of the solvent in the reference cuvette.

5. The sample cell of claim 4 wherein the flow controller is a field flow fractionator.

6. The apparatus of claim 5 wherein the field flow fractionator (FFF) comprises at least one of an asymmetric flow FFF system, a gravitational FFF system, a centrifugal FFF system, a thermal-gradient FFF system, an electrical FFF system, a magnetic FFF system, a flow FFF system, a hollow fiber FFF system, and a split flow thin-cell fractionation system.

7. The sample cell of claim 4 wherein the concentration detector is one of an ultraviolet-visible absorption detector, a differential refractive index detector, and a fluorescence detector.

8. A method comprising:
   injecting a sample into a sample cuvette via a sample injector coupled to the sample cuvette,
      wherein the sample cuvette comprises
         a top sample membrane,
         a sample container to contain the sample, and
         a bottom sample membrane;
   injecting a solvent into a reference cuvette via a solvent injector coupled to the reference cuvette,
      wherein the reference cuvette comprises
         a top reference membrane,
         a reference container to contain the solvent, and
         a bottom reference membrane;
   measuring a concentration of the sample in the sample cuvette over time via a concentration detector coupled to the sample cuvette;
   in response to the concentration being invariant over time, flowing the solvent into the top sample membrane and into the top reference membrane at a particular time, via a flow controller coupled to the sample cuvette and coupled to the reference cuvette; and in response to the flowing, measuring at least one property of the sample.

9. The method of claim 8 wherein the measuring the at least one property of the sample comprises measuring the at least one property of the sample via the concentration detector.

10. A computer implemented method comprising:

transmitting, by a computer system, an inject sample command to a sample injector to inject a sample into a sample cuvette comprising
a top sample membrane,
a sample container to contain the sample, and
a bottom sample membrane;

transmitting, by a computer system, a inject solvent command to a solvent injector to inject a solvent into a reference cuvette comprising
a top reference membrane,
a reference container to contain the solvent, and
a bottom reference membrane;

transmitting, by the computer system, to a concentration detector coupled to the sample cuvette to measure a concentration of the sample in the sample cuvette over time;

executing, by the computer system, a set of logical operations determining that the concentration of the sample is invariant over time;

in response to the determining, transmitting, by the computer system, to a flow controller coupled to the sample cuvette and coupled to the reference cuvette a flow command to flow the solvent into the top sample membrane and into the top reference membrane at a particular time; and in response to the transmitting the flow command, executing, by the computer system, a set of logical operations measuring at least one property of the sample.

11. The method of claim 10 wherein the measuring the at least one property of the sample comprises measuring the at least one property of the sample via the concentration detector.

* * * * *